United States Patent
Shimizu

(10) Patent No.: US 8,665,070 B2
(45) Date of Patent: Mar. 4, 2014

(54) MOBILE ELECTRONIC DEVICE

(75) Inventor: Hiroo Shimizu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 349 days.

(21) Appl. No.: 12/872,586

(22) Filed: Aug. 31, 2010

(65) Prior Publication Data

US 2011/0063080 A1    Mar. 17, 2011

(30) Foreign Application Priority Data

Sep. 17, 2009  (JP) ................................ 2009-216068

(51) Int. Cl.
*H04Q 5/22* (2006.01)
(52) U.S. Cl.
USPC ....................................................... 340/10.1
(58) Field of Classification Search
USPC .............. 340/10.1, 572.4, 5.1, 12.5; 235/435, 235/375
See application file for complete search history.

(56) References Cited

U.S. PATENT DOCUMENTS

| | | | |
|---|---|---|---|
| 7,044,387 B2 * | 5/2006 | Becker et al. ................. | 235/492 |
| 7,198,199 B2 * | 4/2007 | Ho ................................ | 235/492 |
| 2007/0225038 A1 | 9/2007 | Takeda | |

FOREIGN PATENT DOCUMENTS

| | | |
|---|---|---|
| EP | 1 775 858 | 4/2007 |
| EP | 1 862 933 | 12/2007 |
| JP | 2000-066882 | 3/2000 |
| JP | 2008-500600 | 1/2008 |
| WO | WO 2005/116919 | 12/2005 |
| WO | WO 2006/011207 | 2/2006 |

OTHER PUBLICATIONS

Singapore Search Report dated Mar. 18, 2011 for Singapore Patent Appln. No. 201006452-5.
European Search Report dated Jan. 25, 2011.
Japanese Office Action dated Apr. 9, 2013 for 2009-216068.

* cited by examiner

*Primary Examiner* — Vernal Brown
(74) *Attorney, Agent, or Firm* — Pillsbury Winthrop Shaw Pittman, LLP

(57) ABSTRACT

According to one embodiment, a mobile electronic device that makes an initial response in a slot marker system, includes a reception unit configured to receive an initial response command from a terminal, a recognition unit configured to recognize a total slot number N (integer equal to or greater than 2) set in the terminal, from the initial response command received by the reception unit, a logic unit configured to generate an integer n from a random number, a storage unit configured to store data set to the mobile electronic device and representing whether the mobile electronic device is a main device or a sub device, and a control unit configured to cause the logic unit to generate 0 as integer n, thereby responding to the initial response command for the first time, if the mobile electronic device is set as the main device.

6 Claims, 6 Drawing Sheets

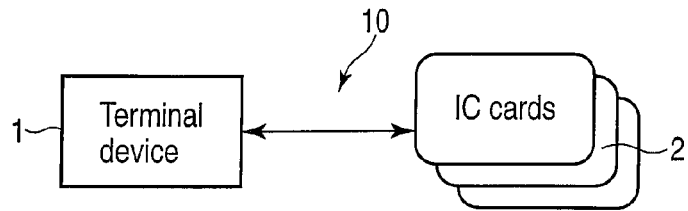
F I G. 1
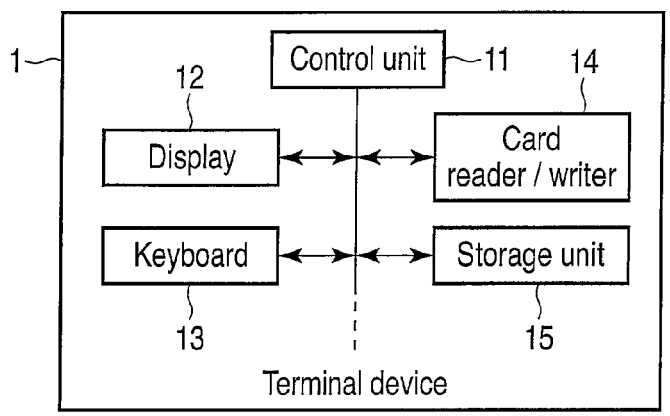
F I G. 2
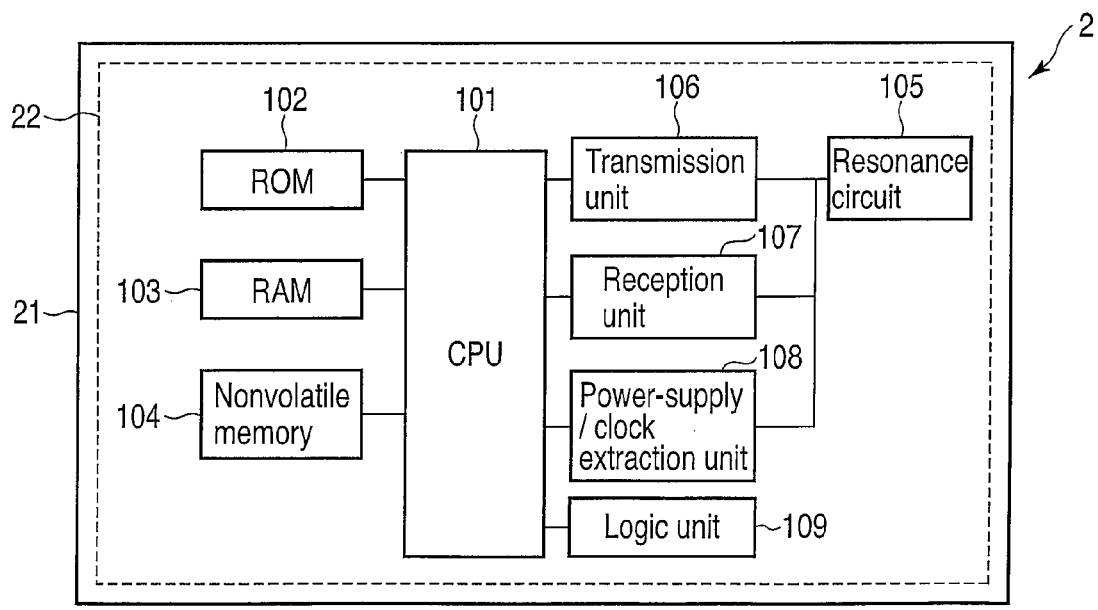
F I G. 3

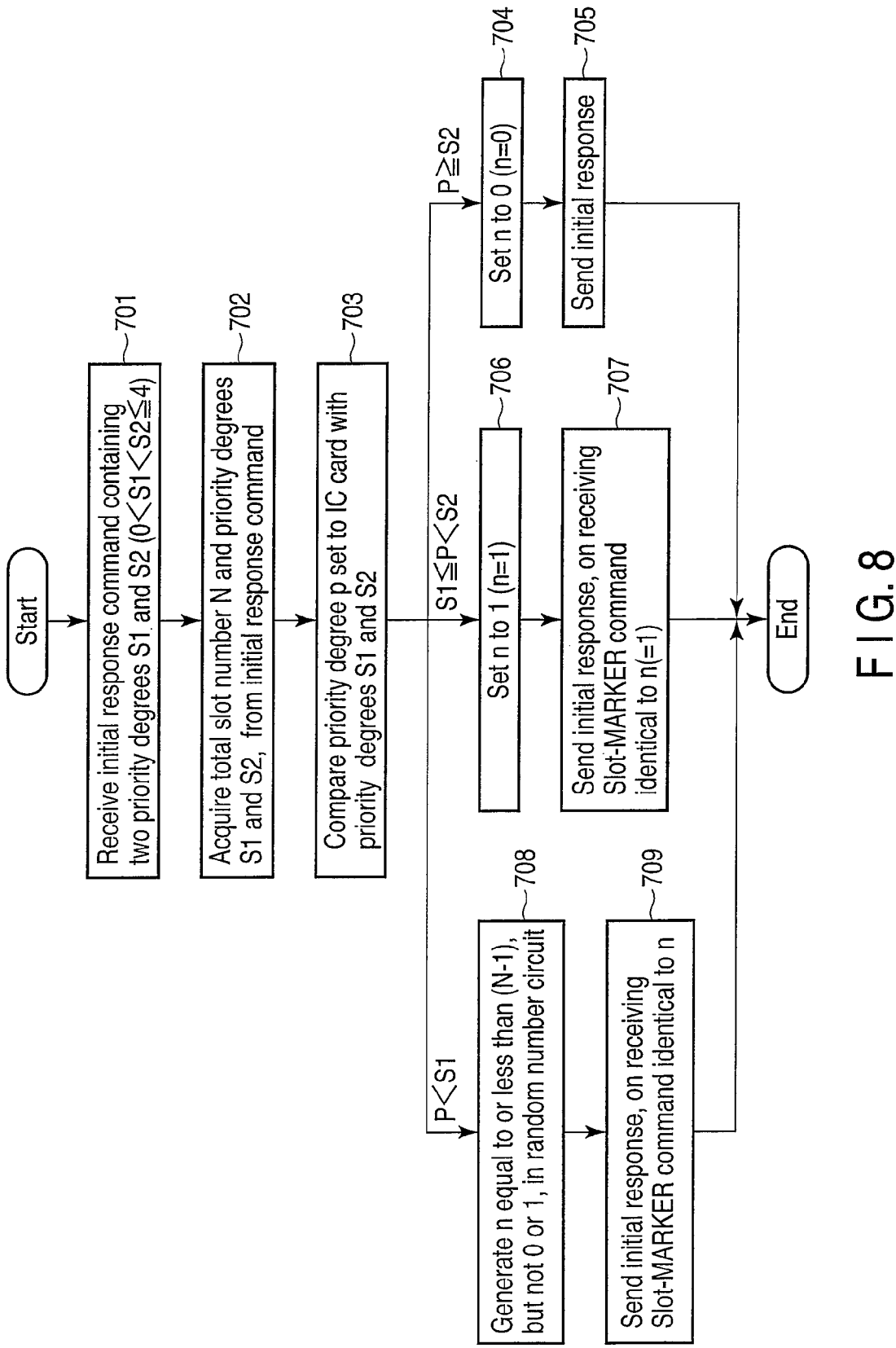
F I G. 8

MOBILE ELECTRONIC DEVICE

CROSS-REFERENCE TO RELATED APPLICATIONS

This application is based upon and claims the benefit of priority from Japanese Patent Application No. 2009-216068, filed Sep. 17, 2009; the entire contents of which are incorporated herein by reference.

FIELD

Embodiments described herein relate generally to a mobile electronic device that transmits and receives, for example, commands to perform various processes.

BACKGROUND

Generally, IC cards used as mobile electronic devices comprise a main body shaped like a card and made of plastic, and an IC module embedded in the main body. The IC module has an IC chip. The IC chip has a nonvolatile memory and a CPU. The nonvolatile memory is, for example, an electrically erasable programmable read-only memory (EEPROM) or a flash read-only memory (ROM), which can hold data even if not supplied with power. The CPU performs various arithmetic operations.

The IC card excels in portability and can perform communication with terminals and complex arithmetic operations. Further, the IC card, which is hard to forge, is intended to store highly classified information, and to be used in security systems and electronic transactions.

In recent years, IC cards that can transmit and receive data in non-contact communication have come into general use. All contactless IC cards have an IC chip and an antenna. The contactless IC card receives a magnetic field emanating from the reader/writer provided on a terminal device that processes data stored in the IC card. The antenna provided in the card operates via electromagnetic induction.

A plurality of IC cards may exist in an area within which the IC cards can communicate with one another through a terminal device. In this case, the terminal device may fail to identify the IC cards correctly. In order to prevent this state known as "collision", thereby to identify the IC cards correctly, the terminal device can perform an anti-collision process in the slot marker system.

In the slot marker system, the terminal device transmits an initial response command, which contains the data representing the total number of slots, to the plurality of contactless IC cards. In each contactless IC card, a logic circuit generates n (integer) ranging from 0 to (N−1). If n=0, the contactless IC card immediately makes an initial response to the terminal device. If n is not 0, the contactless IC card makes no response immediately, and transmits the initial response to the terminal device when it receives from the terminal device a slot marker command that designates the slot identical to n generated by the contactless IC card.

The order in which to perform processes may be predetermined in the contactless IC card. For example, two contactless IC cards, both issued by a financial institution, may be used to settle a transaction. More precisely, the main contactless IC card may be first used to settle a specific amount, and the sub contactless IC card may then be used to settle the remaining amount.

The slot marker system based on ISO:IEC14443 Type B, however, cannot guarantee that the main contactless IC card can always make the initial response before the sub contactless IC card. This is because the main card and the sub card generate n slots, independently of each other.

BRIEF DESCRIPTION OF THE DRAWINGS

FIG. 1 is a diagram explaining an exemplary configuration of an IC card processing system that uses a contactless IC card according to an embodiment;

FIG. 2 is a diagram explaining an exemplary configuration of a terminal device according to the embodiment;

FIG. 3 is a diagram explaining an exemplary configuration of a contactless IC card according to the embodiment;

FIG. 8 is an exemplary flowchart showing how a contactless IC card according to a third embodiment, having one of five priority degrees, operates in a still different manner in response to an initial response command until it sends the command back.

DETAILED DESCRIPTION

Figure 4:
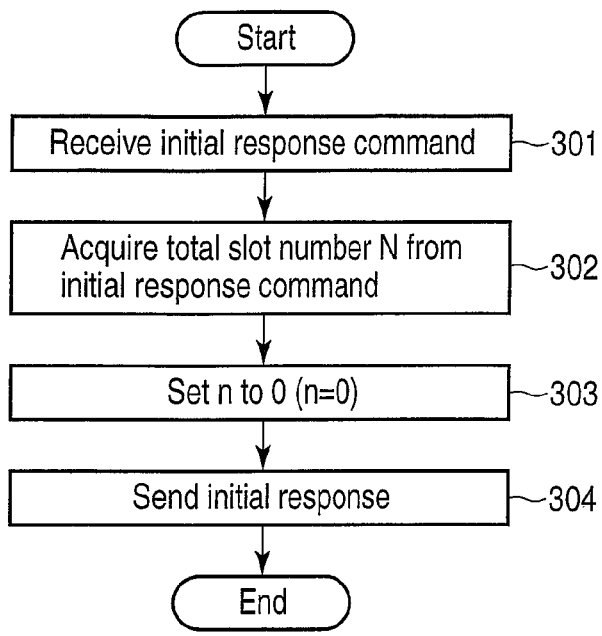
FIG. 4 is an exemplary flowchart showing how a contactless IC card according to the embodiment, whose priority order is set to "main", operates in response to an initial response command until it transmits an initial response.

In general, according to one embodiment, a mobile electronic device that makes an initial response in a slot marker system, comprising: a reception unit configured to receive an initial response command from a terminal; a recognition unit configured to recognize a total slot number N (integer equal to or greater than 2) set in the terminal, from the initial response command received by the reception unit; a logic unit configured to generate an integer n from a random number; a storage unit configured to store data set to the mobile electronic device and representing whether the mobile electronic device is a main device or a sub device; and a control unit configured to cause the logic unit to generate 0 as integer n, thereby responding to the initial response command for the first time, if the mobile electronic device is set as the main device.

First Embodiment

A first embodiment of this invention will be described in detail, with reference to the accompanying drawings.

FIG. 1 is a diagram explaining an exemplary configuration of an IC card processing system 10 that uses a contactless IC card according to an embodiment.

As shown in FIG. 1, the IC card processing system 10 comprises a processing device (terminal device) 1 and contactless IC cards 2. The terminal device 1 is configured to process data in the contactless IC cards 2. The terminal device 1 and each of the contactless IC cards 2 transmit and receive various types of data to from each other.

FIG. 2 is a diagram that explains an exemplary configuration of the terminal device 1 according to the embodiment, which is shown in FIG. 1. As shown in FIG. 2, the terminal device 1 has a control unit 11, a display 12, a keyboard 13, a card reader/writer 14, and a storage unit 15.

The control unit 11 comprises a CPU, a ROM and a RAM. The control unit 11 controls all other components of the terminal device 1.

Under the control of the control unit 11, the display 12 displays various types of data. When operated by a user, the keyboard 13 generates various operation signals.

The card reader/writer 14 is an interface device that performs communication with the contactless IC cards 2. The card reader/writer 14 supplies power, a clock signal and a reset control signal to the contactless IC cards 2, and transmits and receives data to and from the contactless IC cards 2. That is, the card reader/writer 14 functions as transmission/reception unit. The storage unit 15 stores the operating program that the control unit 11 executes, and data that the control unit 11 uses.

The control unit 11 inputs various commands through the card reader/writer 14 to any contactless IC card 2. The contactless IC card 2 receives, for example, a data-write command from the card reader/writer 14. Then, the data received from the terminal device 1 is written into the nonvolatile memory incorporated in the contactless IC card 2.

The control unit 11 transmits a data-read command to the contactless IC card 2, whereby data is read from the contactless IC card 2. The control unit 11 performs various processes on the data received from the contactless IC card 2.

The card reader/writer 14 performs radio communication, transmitting and receiving data to and from the contactless IC card 2. To perform the radio communication, the card reader/writer 14 comprises a signal processing unit, a transmission/reception circuit and an antenna, which are not shown.

The signal processing unit encodes, decodes, modulates and demodulates the data to transmit to the contactless IC card 2, and also the data received from the contactless IC card 2. The transmission/reception circuit amplifies the data modulated by the signal processing unit and the data received by the antenna.

The antenna generates a magnetic field in accordance with the data to be transmitted, thus transmitting the data to the contactless IC card 2. The antenna further recognizes the data transmitted from the contactless IC card 2, on the basis of an induction current generated through electromagnetic induction.

Any area in which the contactless IC card 2 can detect changes in the magnetic field emanating from the antenna is a communication area. In this area, the IC cards 2 can communicate with one another through the terminal device 1. The card reader/writer 14 of the terminal device 1 detects any IC card 2 that exits in the communication area and processes data.

The control unit 11 causes the card reader/writer 14 to transmit an initial response command to the contactless IC card 2, achieving various settings for communication with the contactless IC card 2. In order to detect the contactless IC card 2, the card reader/writer 14 transmits the initial response command in the communication area.

FIG. 3 is a diagram explaining an exemplary configuration of the contactless IC card 2 according to the embodiment, which is shown in FIG. 1.

The contactless IC card 2 comprises a card-shaped main body 21 and an IC module 22 incorporated in the main body 21. The IC module 22 incorporates a CPU 101, a ROM 102, a RAM 103, a nonvolatile memory 104, a resonance circuit 105, a transmission unit 106, a reception unit 107, a power-supply/clock extraction unit 108, and a logic unit 109.

The CPU 101 functions as control unit that controls almost all other components of the contactless IC card 2. The CPU 101 performs various processes in accordance with the control programs and control data, stored in the ROM 102 and the nonvolatile memory 104. For example, the CPU 101 performs processes in response to commands received from the card reader/writer 14 of the terminal device 1, and generates data such as a response.

The ROM 102 is a nonvolatile memory storing control programs and control data. The ROM 102, which stores the control programs and data, has been incorporated into the IC module 22 during the manufacture of the contactless IC card 2. More precisely, control programs and control data have been stored into the ROM 102 in accordance with the specification of the contactless IC card 2.

The RAM 103 is a volatile memory that functions as working memory. The RAM 103 temporarily stores the data the CPU 101 is processing. It temporarily stores, for example, the data received from the terminal device 1 through the reception unit 107. Further, the RAM 103 temporarily stores the program that the CPU 101 executes.

The nonvolatile memory 104 is constituted by, for example, an EEPROM or flash ROM in which data can be written and rewritten. The nonvolatile memory 104 stores control programs and various kinds of data, if necessary, depending on the purpose for which the contactless IC card 2 is used.

In the nonvolatile memory 104, for example, program files and data files are generated. In each file generated, control programs and various kinds of data are written. The CPU 101 can execute the programs stored in the nonvolatile memory 104 or ROM 102, to perform various processes.

The transmission unit 106 and the reception unit 107 are interfaces used to perform non-contact communication with the card reader/writer 14 of the terminal device 1. The transmission unit 106 encodes and modulates data and transmits the data so processed. The reception unit 107 first receives data and then demodulates and decodes the data.

The resonance circuit 105 comprises an antenna and a tuning capacitor. The antenna and tuning capacitor cooperate to achieve non-contact communication with the card reader/writer 14 of the terminal device 1.

The power-supply/clock extraction unit 108 receives electric waves from the card reader/writer 14, and generates an electromotive force and an operating clock signal. The power-supply/clock extraction unit 108 supplies the power and operating clock signal, thus generated, to the other components of the contactless IC card 2. Supplied with power from the unit 108, the other components of the contactless IC card 2 can operate.

The logic unit 109 has various functions, performing arithmetic operations and generating random numbers. The logic unit 109 generates, for example, a random number upon receiving an initial response command from the card reader/writer 14.

How the order in which to process data in the contactless IC card 2 (hereinafter referred to as "priority order") is set will be explained below.

Before issuing the IC cards 2 to users, the IC card company writes the priority order in each IC card 2. The priority order may be written, not only when the IC card 2 is issued, but also when additional IC cards 2 are issued. Moreover, the priority order may never be rewritten once it has been written, or may be rewritten later at any desirable timing. Further, not only can the IC card company rewrite the priority order, but also the users can rewrite the priority order by operating the terminal device they have. Which method of rewriting the priority order should be used depends upon the application software installed in the contactless IC card 2 or the condition, environment and area in which the contactless IC card 2 is used.

How the contactless card according to the first embodiment of this invention works will be explained. In the first embodiment, the priority order is two-fold, i.e., "main" and "sub".

FIG. 4 is an exemplary flowchart showing how a contactless IC card 2 according to the embodiment operates in response to an initial response command until it transmits an initial response.

In Step 301, the contactless IC card 2 receives the carrier coming from the terminal device 1 and is released from the reset state. Therefore, the contactless IC card 2 starts operating and receives the initial response command.

The initial response command transmitted from the card reader/writer 14 of the contactless IC card 2 has a plurality of parameters that designate, for example, the communication system and the speed. One of these parameters contains the data representing the total number of slots.

In Step 302, the contactless IC card 2 acquires the data contained in the initial response command and representing the total number N of slots. In Step S303, the logic unit 109 of the contactless IC card 2 forcibly sets the slot number n to 0 (n=0), if its priority order has been set to "main". As a result, in Step 304, the contactless IC card 2 immediately sends the initial response to the terminal device 1.

Figure 5:
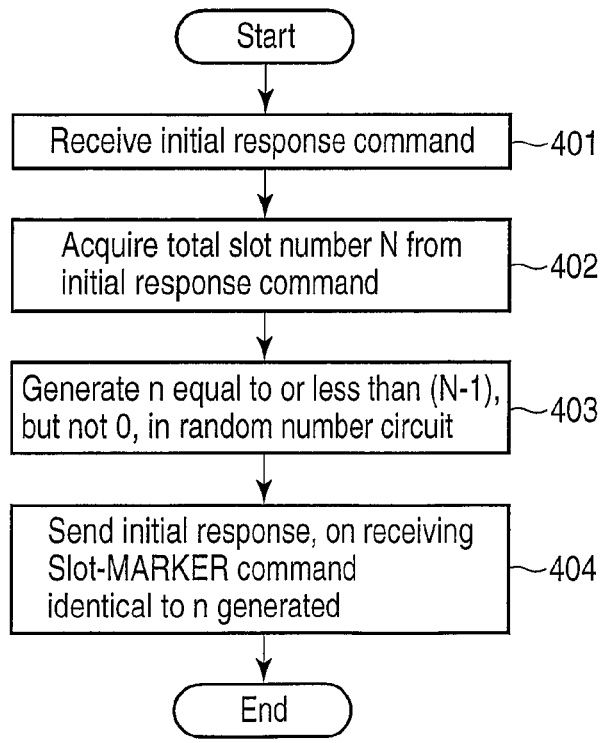
FIG. 5 is an exemplary flowchart showing how a contactless IC card according to the embodiment, whose priority order is set to "sub", operates in response to an initial response command until it sends the command back.

FIG. 5 is an exemplary flowchart showing how the contactless IC card 2 according to the embodiment, whose priority order is set to "sub", operates in response to the initial response command until it sends the initial response command to the terminal device 1.

In Step 401, the contactless IC card 2 receives the carrier coming from the terminal device 1 and is released from the reset state. The contactless IC card 2 therefore starts operating and receives the initial response command.

In Step 402, the contactless IC card 2 acquires the data contained in the initial response command and representing the total number N of slots. In Step 403, the logic unit 109 of the contactless IC card 2 generates slot n, if its priority order has been set to "sub". It should be noted here that n is an integer, ranging from 0 to (N−1), but excluding "0". This is because "0" is used in the card whose priority order has been set to "main". The logic unit 109 generates a random number, and generates one of the integers 1 to (N−1), on the basis of the random number it has just generated.

In Step 404, the contactless IC card 2 does not immediately send the initial response. Instead, it sends the initial response when it receives, from the terminal device 1, a Slot-MARKER command identical to n it has generated.

As described above, the contactless IC card 2 according to the first embodiment is designated beforehand as either a main card that immediately sends a response or a sub card that does not immediately send a response, to an initial response command greater than 1 (N>1). The contactless IC card 2 is so controlled when it receives the initial response command.

Even if the contactless IC card 2 has been designated as a main card or a sub card at the time of issuing it and before the use of it, the designation may be changed or not changed after its issuance. In the former case, a particular command is used.

Second Embodiment

In the first embodiment, the priority order of each contactless IC card 2 is set to either "main" or "sub". In the second embodiment, one of three, four, five or more priority degrees may be set to each contactless IC card 2. The components identical to those of the first embodiment are designated by the same reference numbers, and will not be described in detail.

Figure 6:
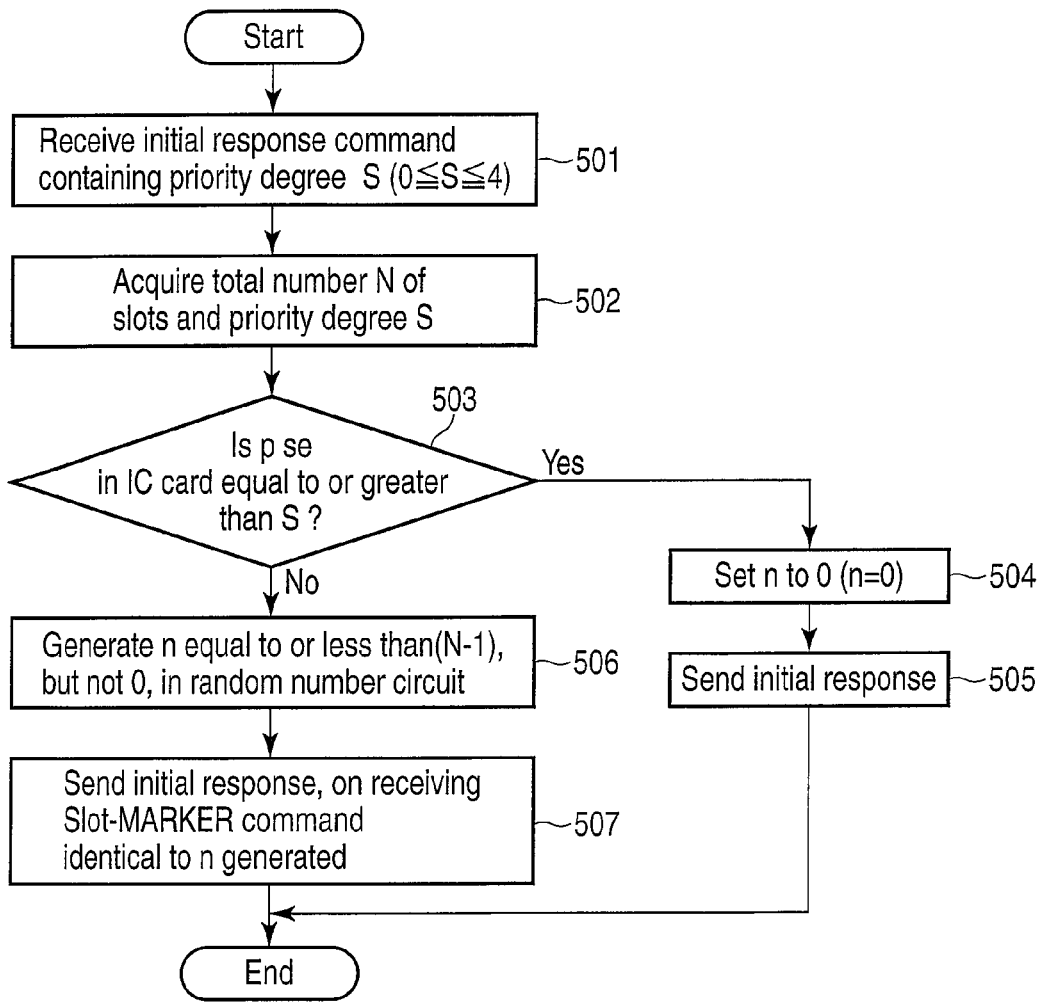
FIG. 6 is an exemplary flowchart showing how a contactless IC card according to a second embodiment, having one of five priority degrees, operates in response to an initial response command until it sends the command back.

FIG. 6 is an exemplary flowchart showing how a contactless IC card according to the second embodiment, having one of five priority degrees, operates in response to an initial response command until it sends the command back.

In the contactless IC card 2, the priority degree p has been set with respect to the initial response. The higher the priority degree, the greater will be the value p. Thus, priority degree 4, for example, is higher than priority degree 1. In the present embodiment, however, the priority degree is not necessarily proportional to the value p.

In Step 501, the contactless IC card 2 receives the carrier coming from the terminal device 1, is released from the reset state and starts operating. Then, the contactless IC card 2 receives the initial response command containing the data representing a priority degree S ($0 \leq S \leq 4$). With reference to this priority degree, the contactless IC card 2 is classified as either a high-priority card or a low-priority card.

In Step 502, the contactless IC card 2 acquires the data representing the total number N of slots and the data representing the priority degree S, both contained in the initial response command. In Step 503, the contactless IC card 2 compares the priority degree p already set, with the priority degree S contained in the initial response command, determining whether p is equal to or greater than S.

If Yes in Step S503, that is, if priority degree p is equal to or greater than S ($p \geq S$), the logic unit 109 of the contactless IC card 2 forcibly sets the slot number n to 0 (n=0) in Step 504. As a result, the contactless IC card 2 immediately sends the initial response in Step 505.

If No in Step 503, that is, if the priority degree is less than S (p<S), the logic unit 109 of the contactless IC card 2 forcibly generates a slot number n in Step 506. The slot number ranges from 0 to (N−1), but not 0, because "0" is used in a card that has a high priority degree. The logic unit 109 generates a random number, and generates one of the integers 1 to (N−1), on the basis of the random number it has just generated.

In Step 507, the contactless IC card 2 does not immediately send the initial response. Instead, it sends the initial response when it receives, from the terminal device 1, a Slot-MARKER command identical to n it has generated.

[Variation of Second Embodiment]

In the second embodiment, each contactless IC card 2 is classified as a high-priority card or a low-priority card in accordance with the priority degree S contained in the initial response command, as has been described above. In a variation of the second embodiment, the contactless IC cards 2 are classified into a plurality of cards of high priority degree and a plurality of cards of low priority degree, as will be explained below.

Figure 7:
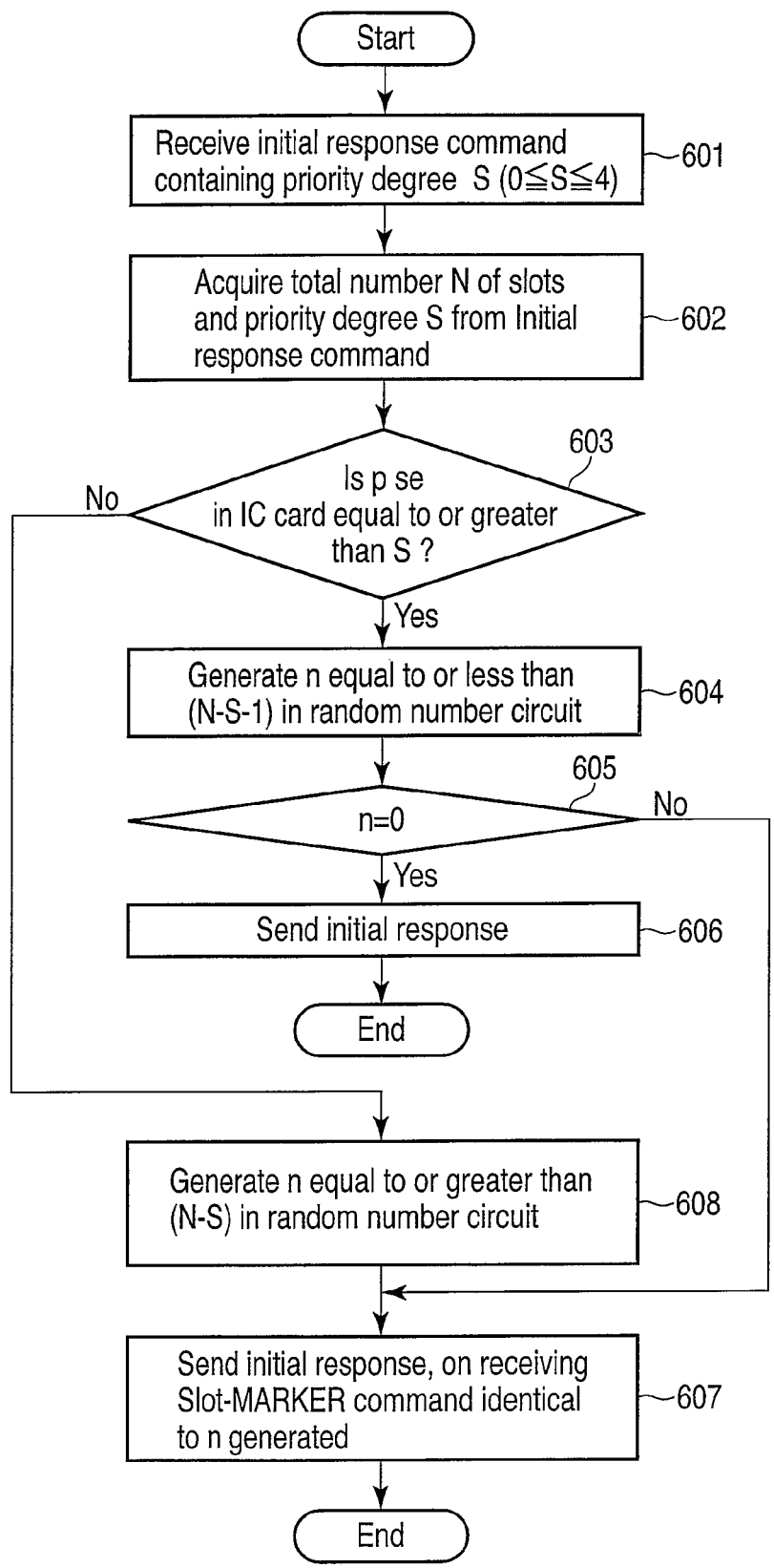
FIG. 7 is an exemplary flowchart showing how a contactless IC card according to a variation of the second embodiment, having one of five priority degrees, operates in response to an initial response command until it sends the command back.

FIG. 7 is an exemplary flowchart showing how a contactless IC card 2 according to the variation of the second embodiment, which has one of five priority degrees, operates in response to an initial response command until it sends the command back.

In each contactless IC card 2, the priority degree p has been set with respect to the initial response. The higher the priority degree, the greater will be the value p. Thus, priority degree 4, for example, is higher than priority degree 1.

In Step 601, the contactless IC card 2 receives the carrier coming from the terminal device 1, is released from the reset state and starts operating. Then, the contactless IC card 2 receives the initial response command containing the data representing a priority degree S ($0 \leq S \leq 4$). With reference to the priority degree S, the contactless IC card 2 is classified as either a high-priority card or a low-priority card.

In Step 602, the contactless IC card 2 acquires the data representing the total number N of slots and the data representing the priority degree S, both contained in the initial response command. In Step 603, the contactless IC card 2 compares the priority degree p already set, with the priority degree S contained in the initial response command, determining whether p is equal to or greater than S.

If Yes in Step S603, that is, if the priority degree p is equal to or higher than S ($p \geq S$), the logic unit 109 of the contactless IC card 2 generates a slot number n. Here, n is an integer, ranging from 0 to (N−S−1). The logic unit 109 generates a random number, and generates one of the integers 1 to (N−S−1) in Step 604, on the basis of the random number it has just generated.

In Step S605, it is determined whether n is 0 or not. If Yes in Step S605, that is, if n=0, the contactless IC card 2 immediately sends the initial response in Step 606. If No in Step S605, that is, if n is not 0, the contactless IC card 2 does not immediately send the initial response. Instead, it sends the initial response when it receives, from the terminal device 1, a Slot-MARKER command identical to n it has generated.

If No in Step S603, that is, if the priority degree p is lower than S, ($p<S$), the logic unit 109 of the contactless IC card 2 generates a slot number n. This slot number n is an integer that ranges from (N−S) to (N−1). The logic unit 109 generates a random number, and generates one of the integers (N−S) to (N−1) in Step 608, on the basis of the random number it has just generated.

In Step 607, the contactless IC card 2 does not immediately send the initial response. Instead, it sends the initial response when it receives, from the terminal device 1, a Slot-MARKER command identical to n it has generated.

Third Embodiment

In the second embodiment, one of three, four, five or more priority degrees is set to each contactless IC card 2, and the initial response command contains one priority degree. In the third embodiment, one of three, four, five or more priority degrees is set to each contactless IC card 2, and the initial response command contains a plurality of priority degrees. The components identical to those of the second embodiment are designated by the same reference numbers, and will not be described in detail.

FIG. 8 is an exemplary flowchart showing how a contactless IC card according to the third embodiment, having one of five priority degrees, operates in a specific manner in response to an initial response command until it sends the command back.

In each contactless IC card 2, the priority degree p has been set with respect to the initial response. The higher the priority degree, the greater will be the value p. Thus, priority degree 4, for example, is higher than priority degree 1.

In Step 701, the contactless IC card 2 receives the carrier coming from the terminal device 1, is released from the reset state and starts operating. Then, the contactless IC card 2 receives the initial response command containing the data representing two priority degrees S1 and S2 ($0<S1<S2\leq 4$). With reference to the priority degrees S1 and S2, the contactless IC card 2 is classified as a high-priority card, an intermediate-priority card, or a low-priority card.

In Step 702, the contactless IC card 2 acquires the data representing the total number N of slots and the data items representing the priority degrees S1 and S2, all contained in the initial response command. In Step 703; the contactless IC card 2 compares the priority degree p already set, with the priority degrees S1 and S2, both contained in the initial response command, determining whether p is equal to or greater than S1 and S2.

If $p \geq S2$ in Step S703, that is, if the contactless IC card 2 has a high priority degree, the logic unit 109 of the contactless IC card 2 forcibly sets the slot number n to 0 (n=0). As a result, the contactless IC card 2 immediately sends the initial response in Step S705.

If $S1 \leq p \leq S2$ in Step S703, that is, if the contactless IC card 2 has an intermediate priority degree, the logic unit 109 of the contactless IC card 2 forcibly sets the slot number n to 1 (n=1).

In this case, the contactless IC card 2 does not immediately send the initial response in Step 707. Instead, it sends the initial response when it receives, from the terminal device 1, a Slot-MARKER command identical to n it has generated.

If $p<S1$ in Step S703, that is, if the contactless IC card 2 has a low priority degree, the logic unit 109 of the contactless IC card 2 generates a slot number n in Step 708. Here, n is an integer, ranging from 0 to (N−1), but not 0 or 1. This is because "0" and "1" are used in contactless IC cards having high priority degrees. The logic unit 109 generates a random number, and generates one of the integers 2 to (N−1), on the basis of the random number it has just generated.

In Step 709, the contactless IC card 2 does not immediately send the initial response. Instead, it sends the initial response when it receives, from the terminal device 1, a Slot-MARKER command identical to n it has generated.

[Variation of Third Embodiment]

In the third embodiment, each non-contact IC card is classified into a high-priority card, an intermediate-priority card, or a low-priority card, in accordance with the priority degrees S1 and S2, both contained in the initial response command. In a variation of the third embodiment, contactless IC cards 2 are classified into some types.

Figure 9:
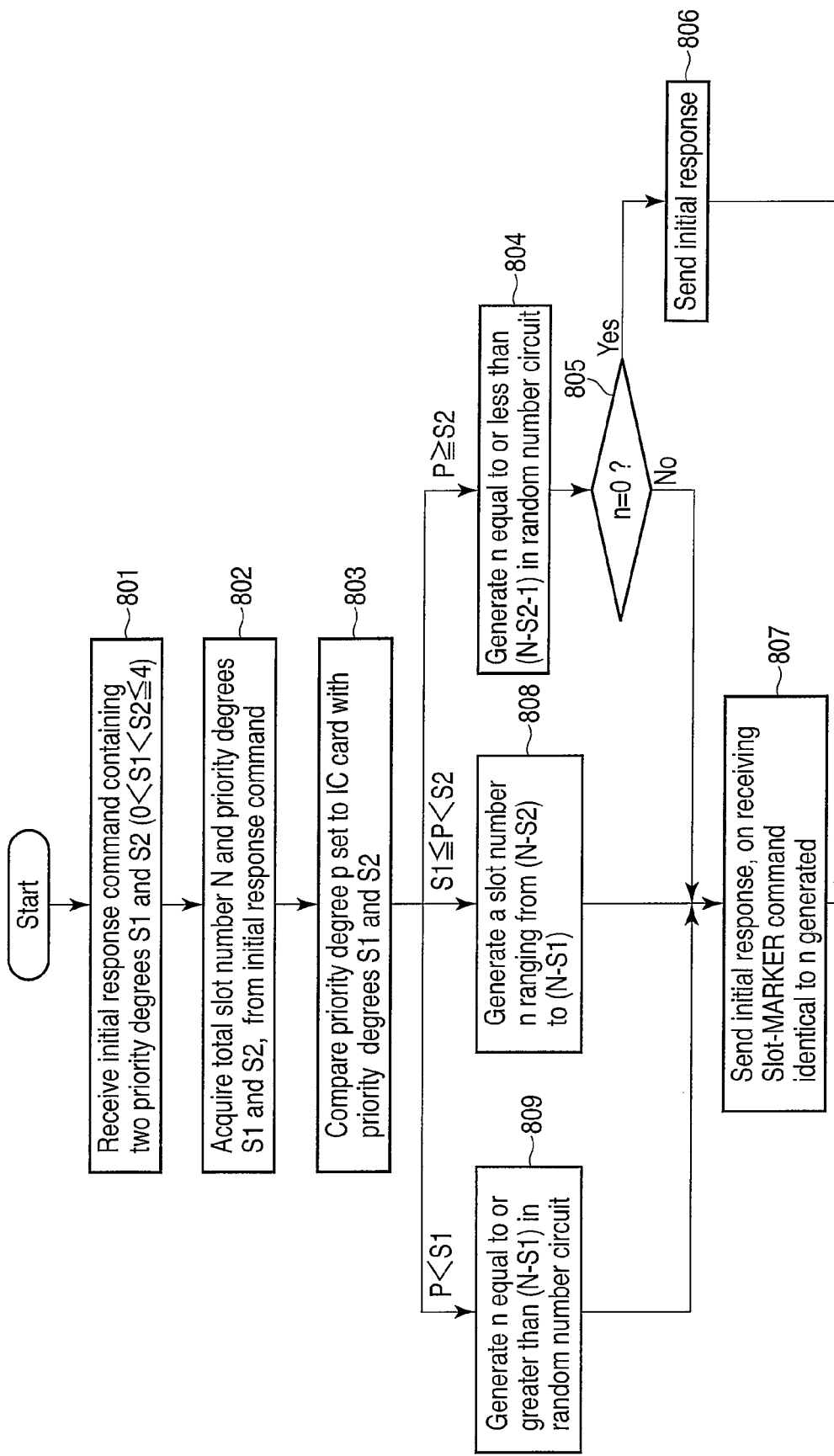
FIG. 9 is an exemplary flowchart showing how a contactless IC card according to a variation of the third embodiment, having one of five priority degrees, operates in response to an initial response command until it sends the command back.

FIG. 9 is an exemplary flowchart showing how a contactless IC card according to a variation the third embodiment, having one of five priority degrees, operates in response to an initial response command until it sends the command back.

In each contactless IC card 2, the priority degree p has been set with respect to the initial response. The higher the priority degree, the greater will be the value p. Thus, priority degree 4, for example, is higher than priority degree 1.

In Step 801, the contactless IC card 2 receives the carrier coming from the terminal device 1, is released from the reset state and starts operating. Then, the contactless IC card 2 receives the initial response command containing the data representing two priority degrees S1 and S2 ($0<S1<S2\leq 4$). With reference to the priority degrees S1 and S2, the contactless IC card 2 is classified as a high-priority card, an intermediate-priority card, or a low-priority card.

In Step 802, the contactless IC card 2 acquires the data representing the total number N of slots and the data items representing the priority degrees S1 and S2, all contained in the initial response command. In Step 803, the contactless IC card 2 compares the priority degree p already set, with the priority degrees S1 and S2, both contained in the initial response command, determining whether p is equal to or greater than S1 and S2.

If $p \geq S2$ in Step S803, that is, if the contactless IC card 2 has a high priority degree, the logic unit 109 of the contactless IC card 2 generates a slot number n. Here, n an integer, ranging from 0 to (N−S2−1). If (N−S2−1) is a negative integer, however, the logic unit 109 generates 0.

In Step 805, it is determined whether n is 0. If Yes in Step 805, the contactless IC card 2 immediately sends the initial response in Step S806. If No in Step 805, that is, if n is not 0, the contactless IC card 2 does not immediately send the initial response. Instead, it sends the initial response in Step 807 when it receives, from the terminal device 1, a Slot-MARKER command identical to n it has generated.

If $S1 \leq p \leq S2$ in Step S803, the logic unit 109 of the contactless IC card 2 generates a slot number n in Step 808. It should be noted here that n is an integer ranging from (N−S2) to (N−S1), i.e., $(N-S2) \leq n < (N-S1)$. In Step 808, the logic unit 109 generates a random number, and generates one of the integers, i.e., $(N-S2) \leq n < (N-S1)$, on the basis of the random number it has just generated. If N−S2=0, however, the logic unit 109 generates one of the integers ranging from 1 to (N−S1), i.e., $1 \leq n < (N-S1)$.

In Step 807, the contactless IC card 2 does not immediately send the initial response. Instead, it sends the initial response later when it receives, from the terminal device 1, a Slot-MARKER command identical to n it has generated.

If p<S1 in Step 803, the logic unit 109 of the contactless IC card 2 generates a slot number n in step 809. Here, n is an integer equal to or greater than (N−S1). The logic unit 109 generates a random number, and generates an integer equal to or greater than (N−S1), on the basis of the random number it has just generated.

In this case, the contactless IC card 2 does not immediately send the initial response in Step 807. Instead, it sends the initial response later when it receives, from the terminal device 1, a Slot-MARKER command identical to n it has generated.

As has been described, at least one priority degree is set in the initial response command in each of the embodiments, thereby controlling the order in which the contactless IC cards 2 respond to the terminal device 1. The contactless IC cards 2 can therefore respond to the terminal device 1 in the order designated.

In some of the embodiments described above, at most five priority degrees are set to the contactless IC cards 2, respectively. Nonetheless, n priority degrees may be set to the contactless IC cards 2.

In the embodiments, at most two priority degrees are set in the initial respond command. Instead, m priority degrees may be set in the command, so long as m is less than n (m<n).

The functions each embodiment described above performs may be implemented not only by hardware, but also by software. In the latter case, the programs describing the functions are read into a computer. Moreover, each function may be implemented by software or hardware.

The present invention is not limited to the embodiments described above. The components of any embodiment can be modified in various manners in reducing the invention to practice, without departing from the sprit or scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card that makes an initial response in a slot marker system, comprising:
   a reception unit configured to receive an initial response command from a terminal;
   a recognition unit configured to recognize a total number of slots N set in the terminal from the initial response command received by the reception unit, where N is an integer equal to or greater than 2;
   a logic unit configured to generate an integer n from a random number;
   a storage unit configured to store a data set to the IC card and representing whether the IC card is a main device or a sub device; and
   a control unit configured to cause the logic unit to:
      generate, as the integer n, 0 to respond to the initial response command for a first time, if the IC card is set as the main device, and
      generate, as the integer n, any integer from 1 to (N−1) to respond to the initial response command for a subsequent time, if the IC card is set as the sub device,
   wherein the control unit is further configured to transmit the initial response command to the terminal when receiving a slot marker command designating a slot which is the same as the number n.

2. The IC card according to claim 1, further comprising a data rewriting unit configured to permit or inhibit alteration of data about the main device or sub device, which is stored in the storage unit.

3. An IC card that makes an initial response in a slot marker system, comprising:
   a reception unit configured to receive an initial response command from a terminal;
   a recognition unit configured to recognize a total number of slots N set in the terminal and at least one reference priority degree from the initial response command received by the reception unit, where the number N is an integer equal to or greater than 2;
   a logic unit configured to generate an integer n from a random number;
   a storage unit configured to store a priority degree set to the IC card; and
   a control unit configured to cause the logic unit to generate 0 as the integer n to respond to the initial response command for the first time, if the priority degree set to the IC card is equal to or higher than a highest reference value,
   wherein the control unit is further configured to transmit the initial response command to the terminal when receiving a slot marker command designating a slot which is the same as the number n.

4. The IC card according to claim 3, further comprising a data rewriting unit configured to permit or inhibit alteration of priority degree data stored in the storage unit to a different priority degree.

5. An IC card that makes an initial response in a slot marker system, comprising:
   a reception unit configured to receive an initial response command from a terminal;
   a recognition unit configured to recognize a total number of slots number N set in the terminal and a plurality of priority degrees from the initial response command received by the reception unit, where the number N is an integer equal to or greater than 2;
   a logic unit configured to generate an integer n from a random number;

a storage unit configured to store a priority degree set to the IC card; and a control unit configured to cause the logic unit to generate as the integer n, any integer from 0 to m if the priority degree set to the IC card is equal to or higher than a highest priority degree S, where m is the integer obtained from N and S, to respond to the initial response command for a first time if the integer n generated by the logic unit is 0, and to respond to the initial response command for a subsequent time if the integer n generated by the logic unit is other than 0, wherein the control unit is further configured to transmit the initial response command to the terminal when receiving a slot marker command designating a slot which is the same as the number n.

6. The IC card according to claim 5, further comprising a data rewriting unit configured to permit or inhibit alteration of priority degree data stored in the storage unit to a different priority degree.

* * * * *